UNITED STATES PATENT OFFICE.

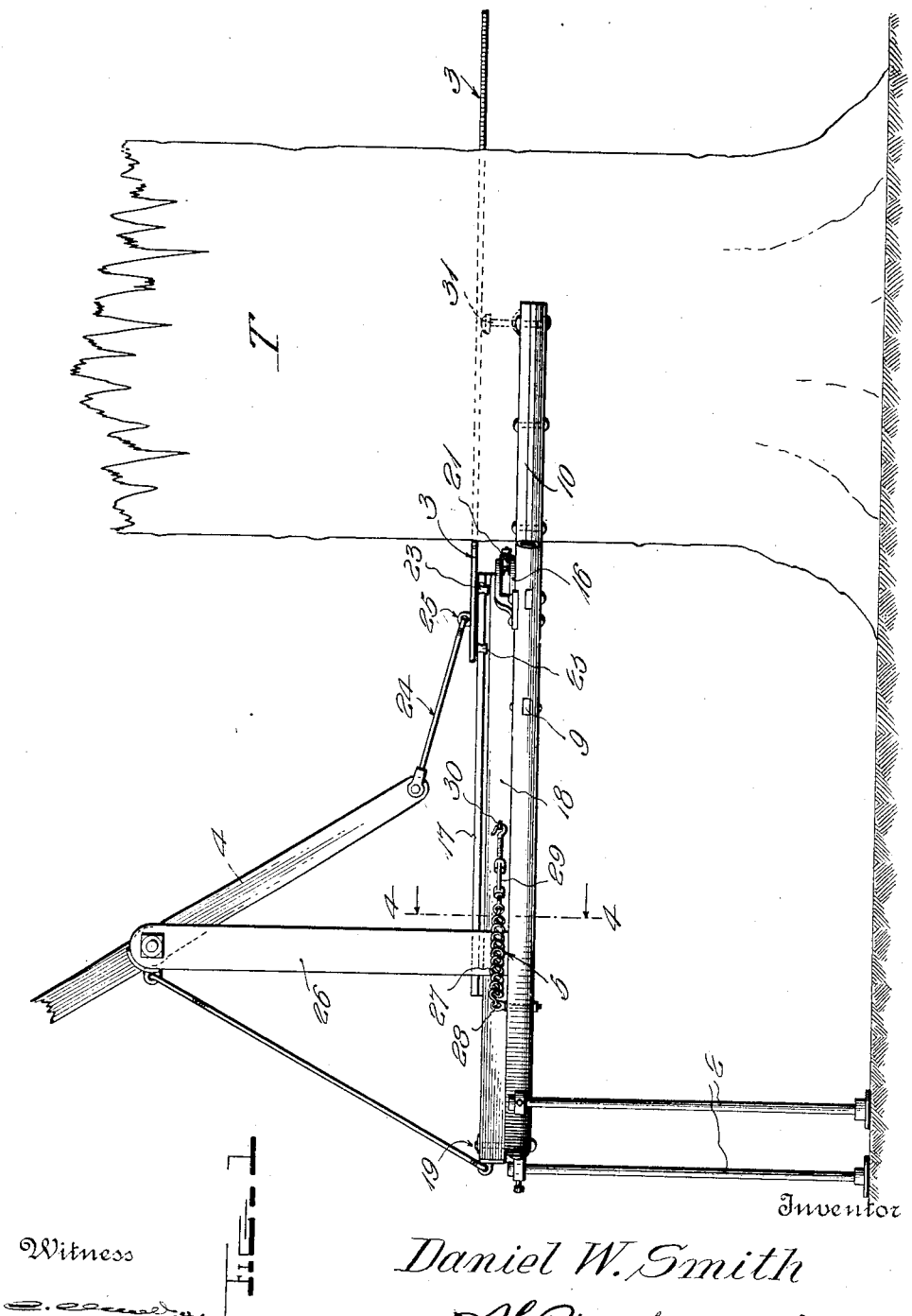

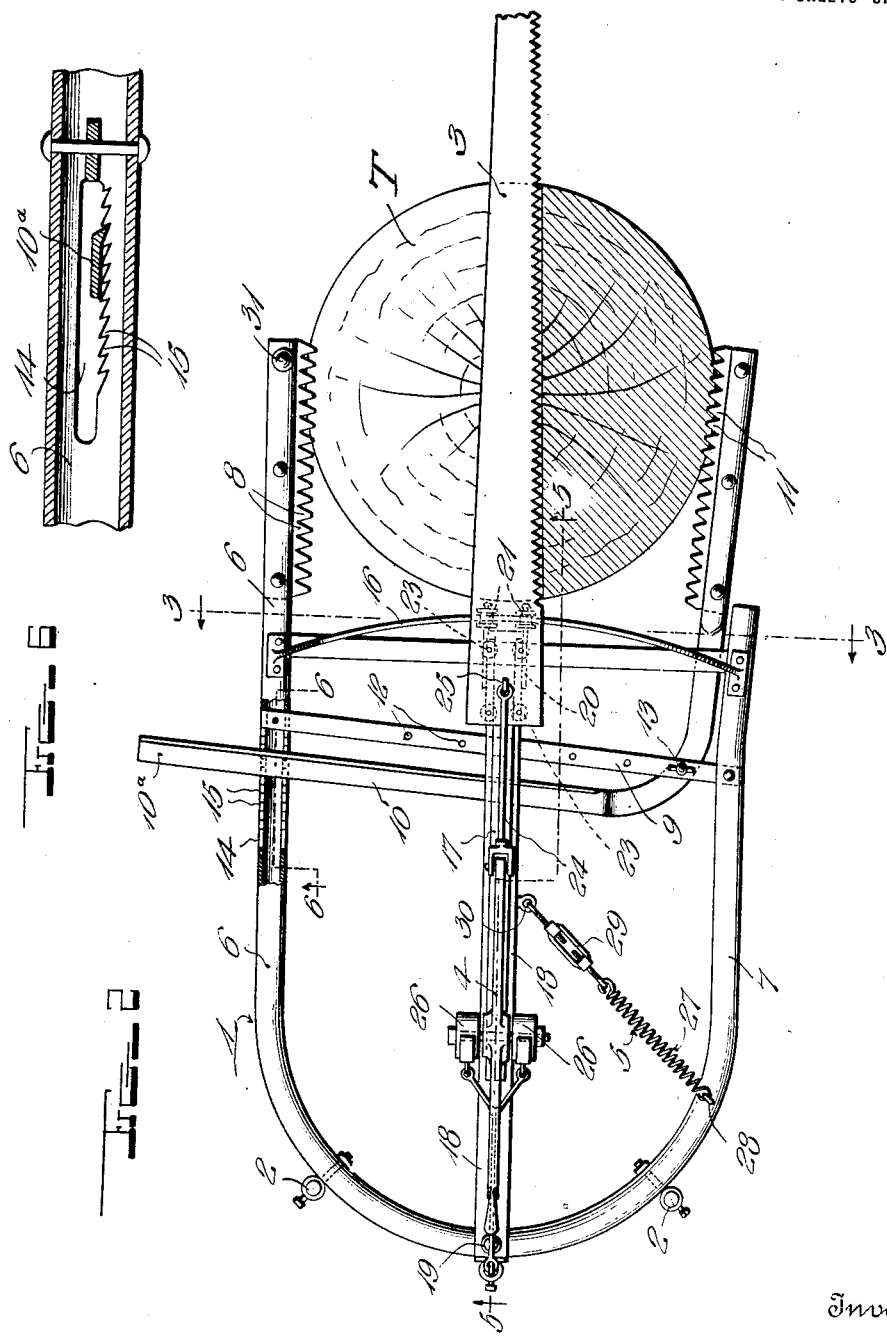

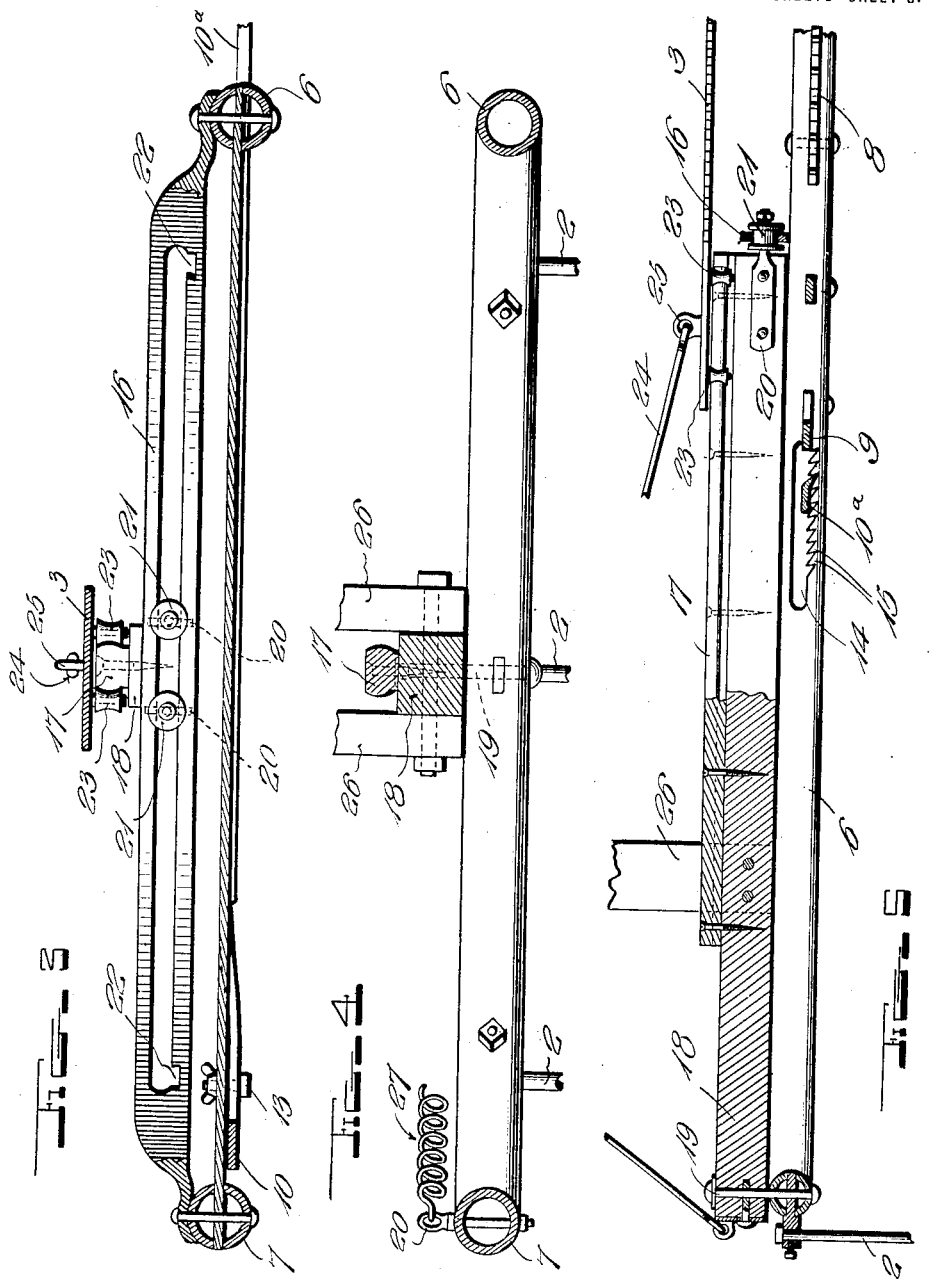

DANIEL W. SMITH, OF BANGOR, MAINE.

SAWING-MACHINE.

1,371,122.     Specification of Letters Patent.     Patented Mar. 8, 1921.

Application filed November 20, 1919. Serial No. 339,328.

*To all whom it may concern:*

Be it known that I, DANIEL W. SMITH, a citizen of the United States, residing at Bangor, in the county of Penobscot and State of Maine, have invented certain new and useful Improvements in Sawing-Machines; and I do declare the following to be a full, clear, and exact description of the invention, such as will enable others skilled in the art to which it appertains to make and use the same.

This invention relates to improvements in sawing machines and it has more particular reference to a tree sawing machine which is especially designed to be operated by manual power.

The principal object of the invention is to provide a device of the above mentioned character which is simple in construction, yet highly efficient in use, one in which the construction is such that it may be readily attached to and detached from the trunk of a tree, the device being adjustable for use with trees of various diameters.

Another object of the invention is to provide a tree sawing machine which is strong, durable, and compact, and one which is inexpensive to both the manufacturer and the user.

Other objects and advantages of the invention will be apparent during the course of the following description.

In the accompanying drawings forming a part of the specification and in which like numerals are employed to designate like parts throughout the same, Figure 1 is a side elevation of a device constructed in accordance with my invention, illustrating the manner in which it is used.

Fig. 2 is a top plan view thereof.

Fig. 3 is a section on the plane of the line 3—3 of Fig. 2.

Fig. 4 is a section on the plane of the line 4—4 of Fig. 1.

Fig. 5 is a section on the plane of the line 5—5 of Fig. 2.

Fig. 6 is an enlarged detail view on the line 6—6 of Fig. 2.

In carrying out my invention I employ a substantially U-shaped supporting frame 1, including a pair of jaws, one of which is movable and the other stationary, and which are designed to grip the article to be acted on, which in this instance is the tree T. The frame is supported at one end by means of legs 2 upon which it may be vertically adjusted. A saw 3 is carried by the frame 1 and is movable laterally, and also in a direction of its length, and it is reciprocated by a hand lever 4, the latter being actuated by manual power. The saw is held in contact with the article being worked on by means of saw feeding means 5.

The frame 1 may be of any suitable formation, but I have shown it as being substantially U-shaped, and it includes a long arm 6 and a short arm 7, the long arm being provided at its end with teeth 8, which may be secured thereto in any suitable manner, and which serve to grip one side of the tree. The frame is stabilized by the employment of a transverse bar 9 which is secured at its opposite ends to the arms 6 and 7. Pivotally mounted on this bar is a substantially L-shaped member or movable jaw indicated by the numeral 10. One end of this L-shaped member, like the arm 6, is provided with teeth 11 which serve to engage the opposite side of the article being acted on, thereby holding the frame and all the parts associated therewith in the proper position for sawing the log, tree or other like article. In order to adapt the device for use in connection with trees of various diameters it will be seen that I mount the member 10 in such a manner that it may be adjusted to properly engage the trees of various sizes. This adjustment may be secured by any suitable means, but I have shown the bar 9 as being provided with a plurality of perforations or holes 12, and the pivot pin 13 which secures the member 10 to the bar 9 is adapted to pass through one of these perforations 12, so that it will be seen that by removing the pivot pin 13 the member 10 may be moved toward or from the arm 6 and the pivot pin placed through any one of the perforations 12, thereby increasing or decreasing the space between the teeth 11 and the teeth 8 according to the direction in which the member 10 is adjusted. With the above construction it will be seen that the pin 13 acts as a pivot pin and also permits easy adjustment of the gripping jaws. In order to retain the teeth 11 of the member 10 in effective engagement with the tree, I have found it necessary to provide some means to lock it against pivotal movement. Any suitable means may be employed for this purpose. However, I have shown the long arm 6 of the U-shaped frame as being provided with a slot 14 (Fig. 6) through which a portion 10ª of the L-shaped member extends, and at the lower edge of the slot 14 I have provided teeth 15, and as one edge of the portion 10ª has its edge sharpened, it will be seen that by engaging this sharpened edge in the teeth 15, the movable jaw member 10 will be held in effective engagement with the trunk of a tree. While I have shown and described a particular means for retaining the jaw 10 in effective engagement with the trunk of a tree, I do not desire to limit myself to this construction, as various other means may be employed for the purpose.

As before stated, the saw 3, which may be of any suitable type, is mounted upon the U-shaped frame 1 and is designed to move in a lateral direction and also in the direction of its length, and in order to obtain such movement of the saw, I employ a pair of tracks 16 and 17, one of which is stationary, and the other of which is pivotally mounted on the U-shaped frame 1. The stationary track 16 is rigidly secured to the arms 6 and 7 and is curved in the manner shown, for a purpose to be hereinafter set forth. On the other hand, the track 17 is carried by an arm 18 which is pivotally mounted on the supporting frame as indicated at 19, and at the free end of the arms 18 are a pair of metal strips 20 which carry grooved rollers 21 which ride in the track 16. It is obvious that this arrangement of parts serves to guide and support the saw 3 in its lateral movement. The track 16 is provided adjacent its opposite ends with notches or pockets 22 into which one of the rollers 23 is designed to drop and be locked against movement in the track when the devise is not in use. The saw 3 carries rollers 23 adjacent its inner end, which as is obvious, ride on the track 17 and guide the saw in a longitudinal or lengthwise direction. The saw 3 is moved backward and forward on the track 17 by means of the actuating lever 4 which is connected to the saw 3 through the medium of the link 24 and eye 25 carried by the saw 3. The lever 4 is supported by and pivoted between a pair of uprights 26 secured on opposite sides of the arm 18.

A saw 3 is moved from left to right and is held in effective engagement with the article being acted on by means of the feeding means, already designated by the numeral 5. This feeding means as here shown is in the form of a coil spring 27 which is connected to an eye 28 at one of its ends and connected at its opposite end to a turn buckle 29, which is in turn detachably connected to an eye 30 carried by the arm 18. With this construction it will be seen that the saw will at all times be pulled into effective cutting engagement with the article being acted on, and the tension of the spring 27 may be varied at the will of the user by means of the turnbuckle 29.

Rising from the outer extremity of the long arm 6 is a headed stud 31, upon which the outer end of the saw 3 may scarf itself straight in a manner well known to lumber men. This stud 31 insures that the saw is in the proper position preparatory to cutting into the tree. In other words, it prevents the outer end of a saw from sagging, as might otherwise occur, thereby preventing twisting or breaking of the saw.

With a machine of the above construction a single operator may cut down trees of considerable size. In using the device he first adjusts the jaw member 10 in the manner already set forth so that the device may be properly engaged on the trunk of the tree. The portion 10ª of the member 11 automatically engages itself in the teeth 15 in the manner already set forth, so that the jaws are now held in effective gripping position on the trunk of the tree. Of course, before the operator engages the device on the tree he adjusts it vertically on the legs 2 so that it is in the proper position, and is also properly supported for use. It is to be assumed here that in cutting trees the operator generally cuts from left to right, therefore the saw 3 is first placed at the extreme left side of the track 16 and its outer end bears on the stud 31. The saw is now ready for use, so the operator grasps the lever 4 and actuates it toward and from him, which motion is imparted to the saw through the medium of the link 24, thus causing the saw to be reciprocated on the track 17. After the saw has started to cut in the tree it is moved laterally in the line of a substantial circle on the track 16, such motion of the saw being caused by the saw feeding mechanism 5, which as before stated, pulls the saw into effective engagement with the tree.

A sawing machine of the foregoing construction is very simple in construction and the parts are so arranged that they may be readily disconnected and the whole device folded up into compact form, thereby permitting it to be readily transported from place to place. The parts too, are also of such construction that very little special machining thereof is required, as the main parts of the whole device are constructed of ordinary gas pipes, flat bars and connecting members.

The manner of assembling and disassembling the parts of the device is thought to be obvious from the foregoing description and further description is therefore deemed unnecessary.

It is to be understood that the form of my invention herein shown and described is to be taken as a preferred form of the same, and that various minor changes in the shape, size, and arrangement of parts may be resorted to without departure from the spirit of the invention or the scope of the subjoined claims.

I claim:

1. A manually operated saw comprising a U-shaped frame formed of hollow tubing and having one arm of greater length than the other and having its extended end portion provided with gripping teeth to form a stationary jaw, a crossbar extending between said arms, a guide bar extending between said arms in front of the cross bar, a lever pivotally connected with the cross bar and having its forward end portion provided with teeth to constitute a movable jaw, one of the arms of the U-shaped frame having a longitudinally extending slot cut to provide rack teeth and the lever having a handle extension extending through the slot and engaging the rack teeth, a pivoted bar extending longitudinally of the frame and having its forward end slidable upon the guide bar, a slidable saw carriage mounted upon said bar, and actuating means for the carriage.

2. A saw comprising a frame having a stationary jaw and a movable jaw associated therewith, an arcuate strip extending transversely of the frame and provided with a longitudinally extending slot having its end portions cut to provide pockets, a bar extending longitudinally of the frame and having its rear end pivotally connected therewith, rollers connected with the forward end portions of the bar and positioned in the slot of the arcuate strip and adapted to drop into the end notches thereof, a carriage slidable longitudinally of the longitudinally extending bar, a cutting blade carried by said carriage, means for yieldably retaining the longitudinally extending bar against swinging movement in one direction and returning the bar to its original position when swung out of its normal position, and means for imparting sliding movement to the carriage longitudinally of said bar.

In testimony whereof I have hereunto set my hand.

DANIEL W. SMITH.